Dec. 3, 1946.    W. N. NELSON ET AL    2,412,002
SEED STRIPPER
Filed Oct. 28, 1943    2 Sheets-Sheet 1

INVENTORS
WALTER N. NELSON
LOUIS A. PAZANDAK
BY
G. H. Braddock
ATTORNEY

Dec. 3, 1946.  W. N. NELSON ET AL  2,412,002
SEED STRIPPER
Filed Oct. 28, 1943  2 Sheets-Sheet 2
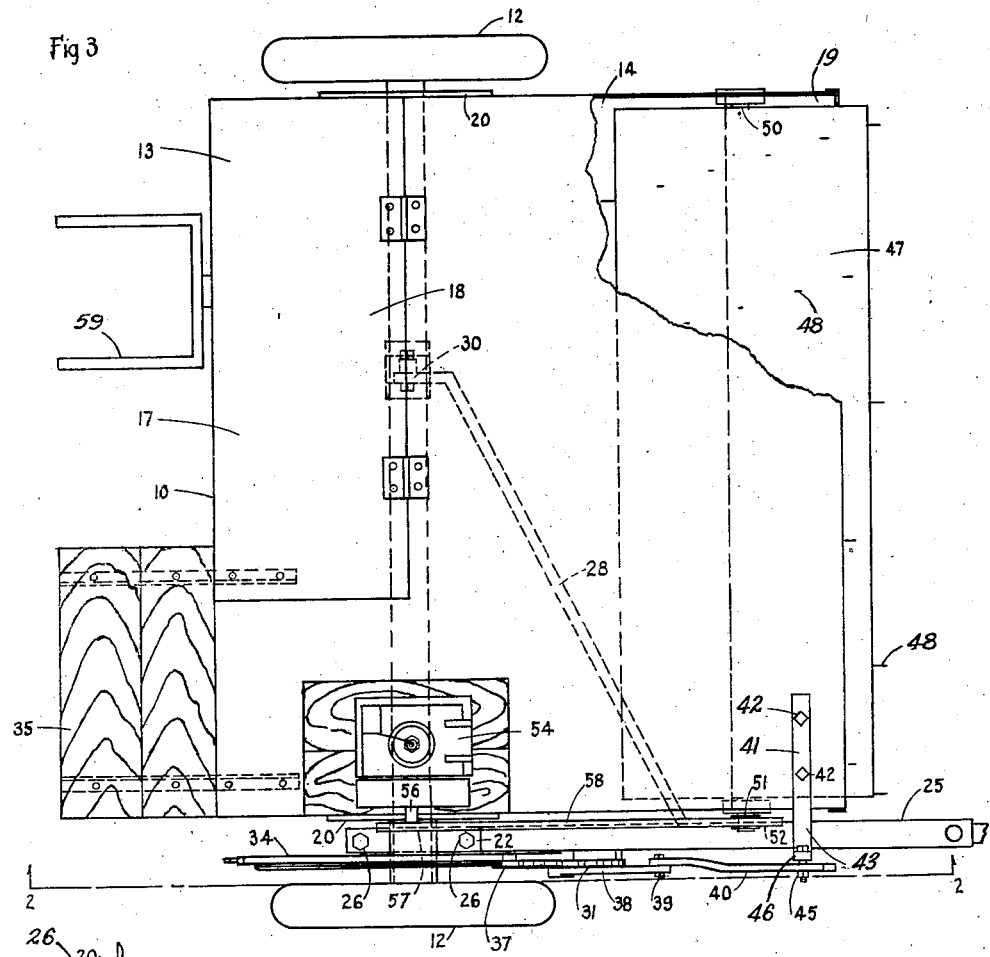
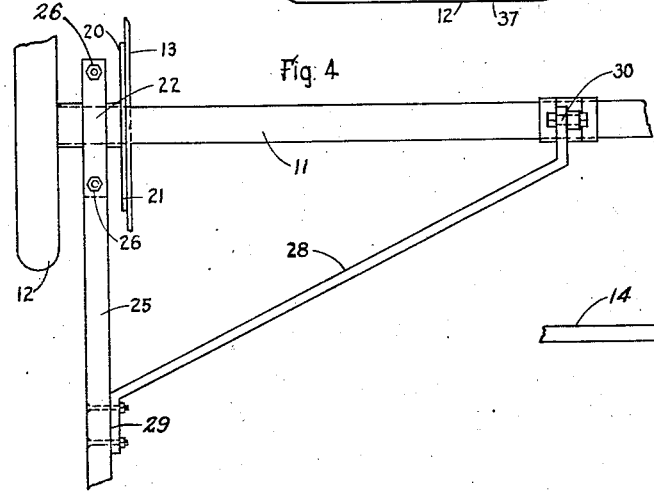
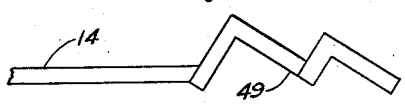
INVENTORS
WALTER N. NELSON
LOUIS A. PAZANDAK
BY *W. H. Braddock*
ATTORNEY Patented Dec. 3, 1946

2,412,002

UNITED STATES PATENT OFFICE 2,412,002

SEED STRIPPER

Walter N. Nelson, Fargo, N. Dak., and Louis A. Pazandak, Minneapolis, Minn., assignors to Newday Seeds Inc., Fargo, N. Dak., a corporation of North Dakota Application October 28, 1943, Serial No. 508,004

7 Claims. (Cl. 280—6)

This invention relates to a seed stripping machine of the character adapted to cause seed to be stripped from grass and other growths and stored in the machine.

An object of the invention is to provide in the seed stripper a novel and improved construction and arrangement for mounting a seed container with stripping entity of the machine and for accomplishing vertical adjustment of said seed container with stripping entity together as a unit closer to and farther from the ground so that said stripping entity selectively can be set to render the seed stripper capable of stripping seed from grass and other growths of varying height and of causing the stripped seed to be stored in said seed container.

With the above object in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a side elevational view of a seed stripping machine incorporating features and characteristics of the invention;

Fig. 2 is a sectional view, partially in elevation, of the seed stripping machine of Fig. 1, a lower part of the view and the upstanding manipulating lever of the machine being shown as they would appear from about the position of line 2—2 in Fig. 3, and an upper portion of said view disclosing the seed container with stripping entity of said machine in section along a vertical plane spaced inwardly of the machine from said upstanding manipulating lever and disposed parallelly of said line 2—2;

Fig. 3 is a top plan view of the seed stripping machine, parts being broken away;

Fig. 4 is a fragmentary bottom plan view detailing features of said seed stripping machine; and Fig. 5 is an enlarged edge view of the stationary stripper element or bar of the seed stripping entity of the machine.

Figure 1:
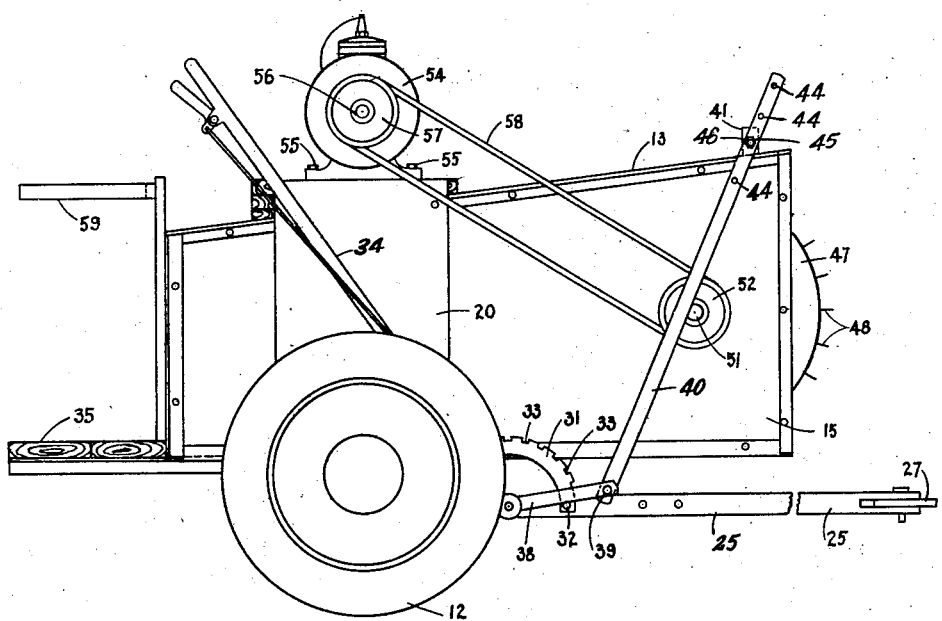
Figure 2:
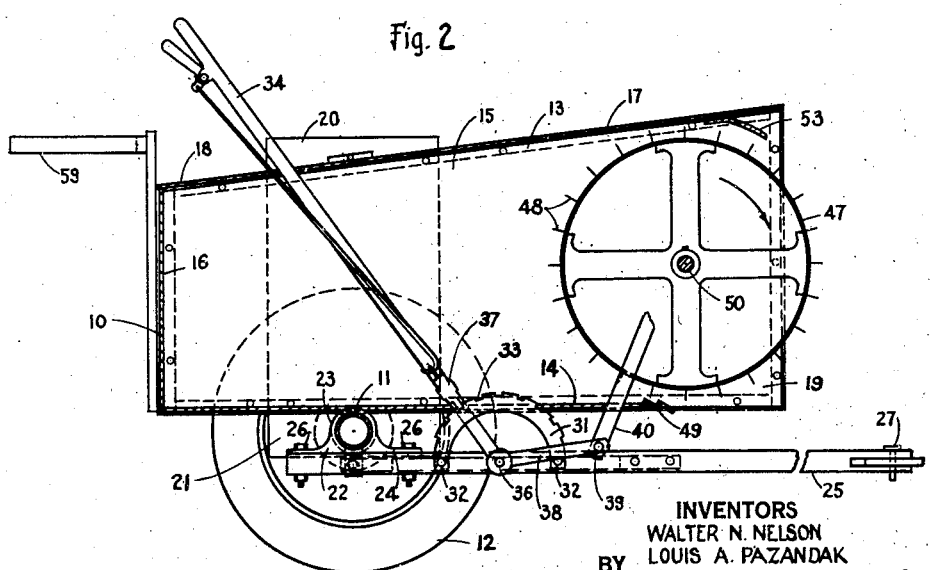

With respect to the drawings and the numerals of reference thereon, the seed stripping machine includes a main frame 10 rigidly fixed upon an axle 11. The axle 11 is supported upon wheels 12 situated at opposite sides of a rectilinear container 13 which the main frame 10 provides or includes. The wheels 12 are rotatable on the axle 11.

The rectilinear container 13 is for the reception of stripped seeds, and the seed stripping machine is equipped to be capable of causing seed to be stripped from standing grass or other growths and stored in said rectilinear container. As disclosed, said rectilinear container includes a substantially horizontal bottom wall 14, spaced apart, vertical side walls 15, 15 which extend upwardly from the side edges of the bottom wall 14 and are disposed longitudinally of the machine, a vertical rear wall 16 which extends upwardly from the rear edge of the bottom wall 14 and is disposed transversely of the machine, and an oblique top wall 17 the side and rear marginal edges of which meet the top edges of the side and rear end walls 15, 15, 16. The oblique top wall 17 includes a hinged door or gate 18 as a part thereof adapted to be opened when it is the intention to remove stripped seed from the rectilinear container 13. The vertical rear wall 16 spans the distance between the spaced apart, vertical side walls 15, 15. Said spaced apart, vertical side walls 15, 15 as disclosed are of equal area. The hinged door or gate 18 desirably is situated at the rearward portion of the oblique top wall 17. The rectilinear container 13 is open at its front. That is, there is no bounding wall at the front of said rectilinear container. Instead, the forward margins or edges of the bottom wall 14, side walls 15, 15 and top wall 17 surround or define a rectilinear opening 19 at the front of the container 13.

The main frame 10 consists of said rectilinear container 13 and supporting plates 20, 20 which are rigidly fixed, as by welding, or otherwise, against the outer surfaces of the spaced apart, vertical side walls 15, 15. The supporting plates 20, 20 are situated at a rearward portion of the rectilinear container 13, but somewhat forwardly of the vertical rear wall 16, about as shown in the drawings. A lower portion 21 of each supporting plate 20 extends to position below the bottom wall 14 of said rectilinear container 13, and is situated upon and welded, or otherwise fixedly secured, to the axle 11. The supporting plates 20, 20 are spaced inwardly from the wheels 12, 12. It will be apparent that the supporting plates 20, 20 fixedly secure the rectilinear container 13 upon and to the axle 11 at location intermediate the wheels 12, 12.

A hollow bracket 22 is rotatably supported, as at 23, upon the axle 11 at a location between one of the wheels 12 and the adjacent supporting plate 20, and said hollow bracket 22 is retained, in any suitable and convenient manner, in spaced relation to the wheel and supporting plate between which it is situated. A lower, elongated portion 24 of the hollow bracket 22 is situated below the axle 11 and extends both forwardly and rearwardly of said axle.

A draw bar 25, made rigid, as at 26, with the hollow bracket 22, is engaged up against the lower surface of the elongated portion 24 of said hollow bracket and extends longitudinally forwardly at a side of the main frame 10. Said draw bar 25 is adapted to have its forward end portion 27, situated forwardly of the rectilinear container 13, fixedly secured to a conveying vehicle (not shown) for the seed stripping machine, such, for example, as a tractor. The draw bar 25 is spaced inwardly of the wheel 12 which is at the same side of the machine as said draw bar, and outwardly of the adjacent supporting plate 20, as well as situated at elevation below the axle 11.

An elongated brace 28 is rigidly secured, as at 29, against the inner surface of the draw bar 25 at location spaced somewhat forwardly of the axle 11 and extends obliquely inwardly and rearwardly of the seed stripping machine. The inner end portion of the elongated brace 28 is rotatably supported, as at 30, upon said axle 11 for vertical swinging movement. The construction and arrangement are such that the draw bar 25 and the elongated brace 28 can be swung as a unit, downwardly and upwardly, upon the axle 11. The inner end of the elongated brace 28 desirably may be disposed at about the midwidth of the seed stripping machine.

A quadrant 31 is suitably and conveniently supported, as at 32, upon the draw bar 25 and includes usual upwardly opening notches 33. An upstanding manipulating lever 34 is situated to be accessible to an attendant of the machine when standing upon a platform 35 carried by the main frame 10. The lower end of the upstanding manipulating lever 34 is pivoted, as at 36, upon the draw bar 25, at a location concentric to the quadrant 31. Said upstanding manipulating lever includes a detent 37 adapted to be adjusted along, engaged with and released from said notches 33. The rearward end of a crank arm 38 is rigid with or integral with the lower end of the upstanding manipulating lever at the location of the axis 36 for said upstanding manipulating lever, and the forward end of the crank arm 38 is pivotally secured, as at 39, to the lower end portion of an oblique strip or link 40 which extends upwardly and forwardly from said crank arm. A bracket member 41 secured, as at 42, against the upper surface of the top wall 17 of the rectilinear container 13, includes an extension portion 43 thereof at the side of said rectilinear container adjacent the draw bar 25. The bracket member 41 is situated adjacent the forward end of the rectilinear container 13, and the extension portion 43 overhangs the draw bar 25 and is disposed transversely of said draw bar. The oblique strip or link 40 includes spaced apart holes 44 in its upper end portion adapted selectively to receive a headed and nutted bolt 45 situated in an angle piece 46 at the outer end of and integral with said bracket member 41. The construction and arrangement are such that the headed and nutted bolt 45 constitutes a pivotal connection between the upper end portion of the oblique strip or link 40 and the outer end of the bracket member 41.

It will be evident that the main frame 10, constituted as the supporting plates 20, 20 and the rectilinear container 13, will be retained at fixed elevation, against rotational movement with the axle 11 relative to the draw bar 25, by the mechanism described when the detent 37 is situated in one of the notches 33. It also will be evident that said main frame can be swingingly manipulated in a vertical plane, so that its forward portion will be closer to or farther from the ground, by adjustment of said detent 37 along said notches 33, and that the forward portion of the main frame will be closer to the ground when a lower hole 44 is upon the bolt 45 and farther from the ground when an upper hole 44 is upon said bolt 45. When the forward portion of the rectilinear container 13 is swung closer to the ground the machine is adapted better to be capable of stripping seed from relatively short grass or other growths, and when said forward portion of said rectilinear container is swung farther from the ground said machine is adapted better to be capable of stripping seed from comparatively longer grass or other growths.

During practical operation of the seed stripper the draw bar 25 is held at fixed elevation by the conveying vehicle to which said draw bar is attached, and the rectilinear container 13 is held at fixed elevation, against tendency toward downward tilting of the forward portion of said rectilinear container by reason of gravity, by the mechanism described, including the manipulating lever 34, the crank arm 38, the oblique strip or link 40 and the bracket member 41. With rearward swinging movement of the manipulating lever 34, the crank arm 38 is swung upwardly thus to elevate the oblique strip or link 40 and cause the forward portion of the rectilinear container 13 to be swung upwardly, away from the draw bar 25. With forward swinging movement of said manipulating lever, said crank arm is swung downwardly thus to lower said oblique strip or link and causes said forward portion of said rectilinear container to be swung downwardly, toward said draw bar.

A stripping entity of the seed stripping machine consists of a rotatable stripper cylinder 47 having stripper teeth or tines 48 upon its outer surface and a stationary stripper element or bar 49. The rotatable stripper cylinder 47 is disposed within the forward portion, or mouth, or rectilinear opening 19, of the container 13, and, as disclosed, a forward portion of said stripper cylinder is situated slightly forwardly of the front end or margin of said container. The stationary stripper element or bar 49 is situated at the forward end of the bottom wall 14 of the rectilinear container 13, at about or slightly above the elevation of said bottom wall, directly beneath the stripper cylinder, and the stripper teeth or tines 48 and said stationary stripper element or bar are adapted to cooperate with each other in well known manner to cause seed to be stripped from standing grass or other growths in response to rotation of the stripper cylinder 47 in the direction as indicated by the arrow. A transverse supporting shaft 50 for the stripper cylinder 47 is rotatably mounted in the opposite side walls 15, 15 of the rectilinear container 13, and said stripper cylinder is keyed to said transverse shaft to rotate therewith. An extension 51 of the transverse supporting shaft 50, situated at the outer side of a side wall 15, fixedly carries a pulley 52. A downwardly and forwardly extending baffle plate 53 upon the lower surface of the top wall 17 of the rectilinear container 13 and at location above the rotatable stripper cylinder 47 is for precluding removal of seed from said container as might occur, but for the provision of said baffle plate, by reason of rotational movement of the upper portion of said stripper cylinder.

Mechanism for driving the stripper cylinder 47 may include an internal combustion engine 54 suitably and conveniently mounted upon the main frame 10. As disclosed, said engine 54 is bolted down, as at 55, upon the upper surface of the top wall 17. A driven shaft 56 of the internal combustion engine 54 fixedly supports a pulley 57, and a drive belt 58 rides upon the pulleys 52 and 57.

Numeral 59 represents a bag support at the rear of the main frame and adjacent the hinged door or gate 18. In practice, a bag may be placed upon the support 59 in position to receive seed removed manually from the rectilinear container 13 by way of the opening covered by said hinged door or gate 18.

What is claimed is:

1. In combination, an axle, wheels supporting said axle, a frame, supporting plates rigid with said frame and upon said axle, a forward portion of said frame being disposed forwardly of said axle, a bracket rotatably supported by said axle, a draw bar rigid with said bracket and extending forwardly of said axle and frame, a quadrant supported by said draw bar, an upstanding manipulating lever pivoted upon said draw bar and supporting a detent selectively for engaging notches in said quadrant, a crank arm rigid with said upstanding manipulating lever and extending forwardly, and an upwardly and forwardly extending link pivoted between said crank arm and said forward portion of the frame.

2. In combination, an axle, wheels supporting said axle, a frame, supporting plates rigid with an intermediate portion of said frame and upon said axle, a bracket rotatably supported by said axle, a draw bar rigid with said bracket and extending forwardly of said axle and frame, a quadrant supported by said draw bar, an upstanding manipulating lever pivoted upon said draw bar and supporting a detent selectively for engaging notches in said quadrant, a crank arm rigid with said upstanding lever and extending forwardly, and an upwardly extending link pivoted between said crank arm and a portion of said frame situated forwardly of said axle.

3. In combination, an axle, wheels supporting said axle, a frame, supporting plates rigid with an intermediate portion of said frame and upon said axle, said axle having a portion thereof situated outwardly of said frame at a side thereof, a bracket rotatably supported by said portion of said axle situated outwardly of said frame, a draw bar rigid with said bracket and extending forwardly of said axle and frame, a quadrant supported by said draw bar, an upstanding manipulating lever pivoted upon said draw bar and supporting a detent selectively for engaging notches in said quadrant, a crank arm rigid with said upstanding lever and extending forwardly, and an upwardly and forwardly extending link pivoted between said crank arm and a side portion of said frame situated above said draw bar and forwardly of said axle.

4. In combination, an axle, wheels at the opposite ends of and supporting said axle, a frame including opposite side walls, supporting plates rigid with intermediate portions of said opposite side walls of the frame and upon said axle, said frame being in adjacent relation to one of said wheels and in spaced relation to the other of said wheels, a bracket rotatably supported by said axle and situated at a side of said frame, a draw bar rigid with said bracket and extending forwardly of said axle and frame, a quadrant supported by said draw bar, an upstanding manipulating lever pivoted upon said draw bar and supporting a detent selectively for engaging notches in said quadrant, a crank arm rigid with said upstanding lever and extending forwardly, and an upwardly extending link pivoted between said crank arm and a portion of said frame situated above said draw bar and forwardly of said axle.

5. In combination, an axle, wheels supporting said axle, a frame including spaced apart, rigidly connected, opposite side walls, supporting plates rigid with intermediate portions of said opposite side walls of the frame and upon said axle, a bracket rotatably supported upon said axle between one of said supporting plates and one of said wheels, said bracket being situated at a side of said frame, a draw bar rigid with said bracket and extending forwardly of said axle and frame at a side of said frame, a quadrant supported by said draw bar, an upstanding manipulating lever pivoted upon said draw bar and supporting a detent selectively for engaging notches in said quadrant, a crank arm rigid with said upstanding lever at its axis and extending forwardly, and an upwardly extending link pivoted between said crank arm and a portion of said frame situated above said draw bar and forwardly of said axle.

6. In combination, an axle, wheels supporting said axle, a frame including spaced apart, rigidly connected, opposite side walls, supporting plates rigid with intermediate portions of said opposite side walls of the frame and upon said axle, a bracket rotatably supported upon said axle between a lower portion of one of said supporting plates and one of said wheels, said bracket being situated at a side of said frame, a draw bar below and rigid with said bracket and extending forwardly of said axle and frame at a side of the frame, a quadrant supported by said draw bar, an upstanding manipulating lever pivoted upon said draw bar and supporting a detent selectively for engaging notches in said quadrant, a crank arm rigid with said upstanding lever at its axis and extending forwardly, and an upwardly extending link pivoted between said crank arm and a portion of said frame situated above said draw bar and forwardly of said axle.

7. In combination, an axle, wheels supporting said axle, a frame including spaced apart, rigidly connected, opposite side walls, supporting plates rigid with intermediate portions of said opposite side walls of the frame and upon said axle, said frame being in adjacent relation to one of said wheels and in spaced relation to the other of said wheels, a bracket rotatably supported upon said axle at a side of said frame and between a lower portion of one of said supporting plates and one of said wheels, said bracket being situated at a side of said frame, a draw bar below and rigid with said bracket and extending forwardly of said axle and frame at a side of the frame, a quadrant supported by said draw bar, an upstanding maniplating lever pivoted upon said draw bar and supporting a detent selectively for engaging notches in said quadrant, a crank arm rigid with said upstanding lever at its axis and extending forwardly, and an upwardly extending link pivoted between said crank arm and a portion of said frame situated above said draw bar and forwardly of said axle.

WALTER N. NELSON.
LOUIS A. PAZANDAK.